United States Patent [19]
Shim

[11] Patent Number: 5,793,928
[45] Date of Patent: Aug. 11, 1998

[54] METHOD FOR AUTOMATIC SETTING OF A TIMER RESERVATION MODE AND AN ASSOCIATED CLOCK IN A VCR

[75] Inventor: Soon Sun Shim, Kyonggi-do, Rep. of Korea

[73] Assignee: Samsung Electronics Co., Ltd., Kyungki-Do, Rep. of Korea

[21] Appl. No.: 880,366

[22] Filed: Jun. 23, 1997

Related U.S. Application Data

[63] Continuation of Ser. No. 953,915, Sep. 30, 1992.

[30] Foreign Application Priority Data

Oct. 16, 1991 [KR] Rep. of Korea ............ 91-18211

[51] Int. Cl.$^6$ .................. H04N 5/91; H04N 9/79
[52] U.S. Cl. ............................ 386/83; 386/46
[58] Field of Search .................. 386/87, 46, 1, 386/123, 124; 455/151, 181.1, 186.1, 182; 348/736; H04N 5/91, 9/79

[56] References Cited

U.S. PATENT DOCUMENTS

| | | | |
|---|---|---|---|
| 4,566,034 | 1/1986 | Harger et al. | 358/194 |
| 4,641,205 | 2/1987 | Beyers, Jr. | 358/355 |
| 4,807,052 | 2/1989 | Amano | 358/194 |
| 4,879,611 | 11/1989 | Fukui et al. | 386/83 |
| 4,977,455 | 12/1990 | Young | 386/83 |
| 5,187,589 | 2/1993 | Kono et al. | 386/83 |

FOREIGN PATENT DOCUMENTS 2005070  6/1990  Canada .

*Primary Examiner*—Robert Chevalier
*Attorney, Agent, or Firm*—Sughrue, Mion, Zinn, Macpeak & Seas, PLLC

[57] ABSTRACT

In a VCR employing multiple reservation modes, the last used reservation mode is memorized by a microprocessor, and, at the time for setting a next reservation, the memorized reservation mode is automatically set. At that time, if the current time has not been set, a shift is automatically made to an automatic time adjusting mode, and the memorized reservation mode is set after the user manually sets the current time. This invention simplifies the reservation setting procedure and provides convenience to users.

10 Claims, 3 Drawing Sheets

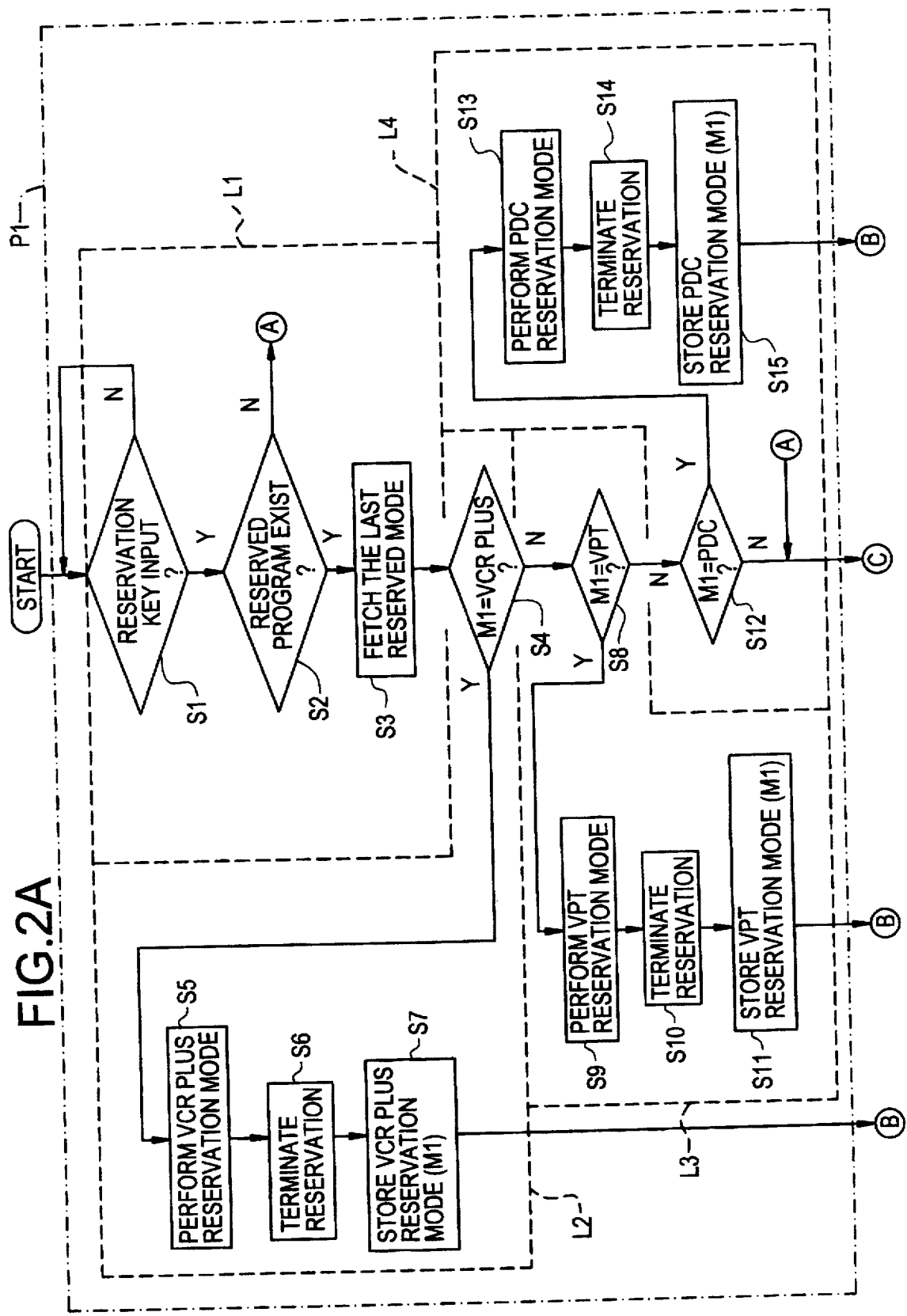

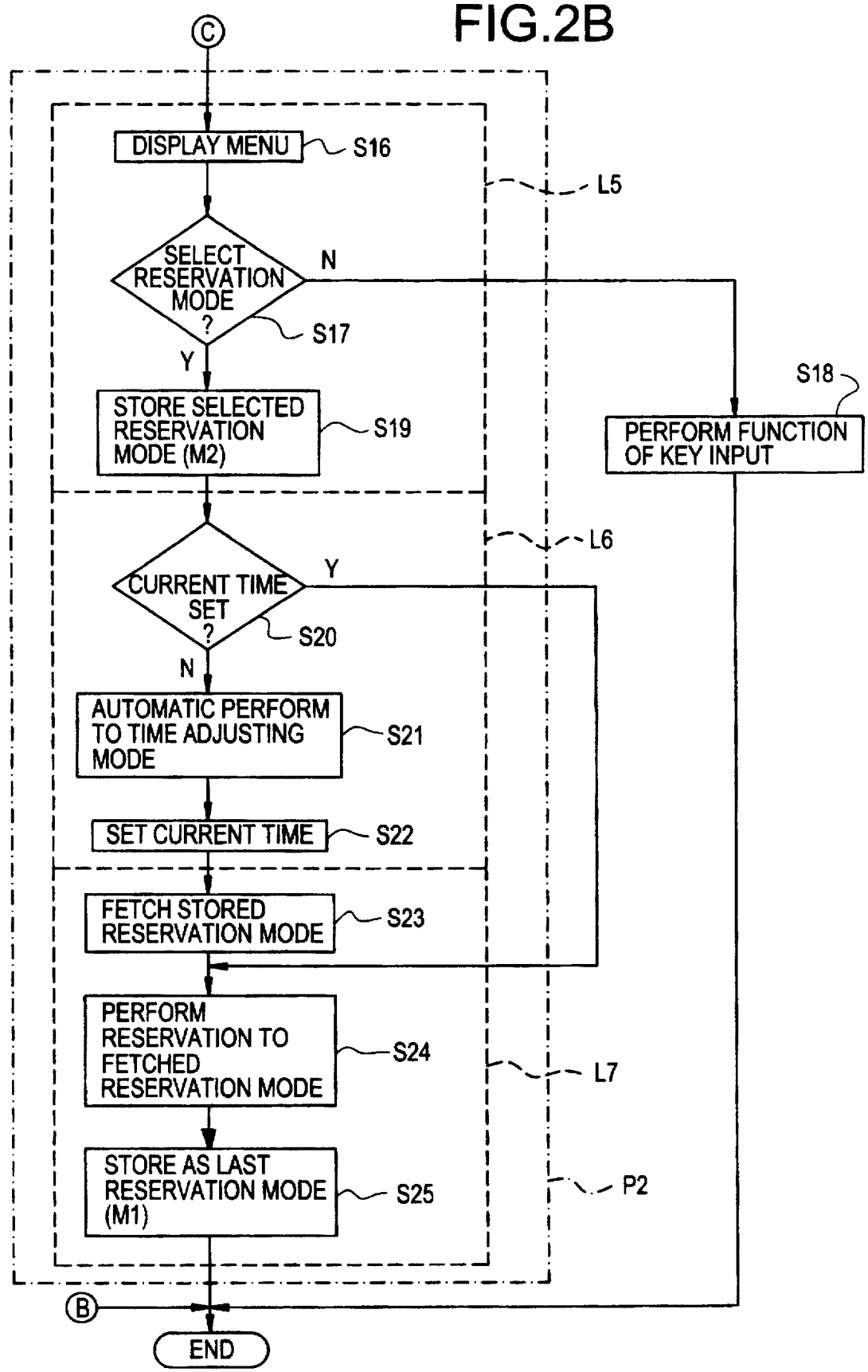

METHOD FOR AUTOMATIC SETTING OF A TIMER RESERVATION MODE AND AN ASSOCIATED CLOCK IN A VCR

This is a continuation of Application No. 07/953,915 filed Sep. 30, 1992.

FIELD OF THE INVENTION

The present invention relates to a video cassette recorder (termed VCR) employing multiple reservation modes, and particularly to an automatic setting method in a timer reservation mode for programmed recording in a VCR, in which a microprocessor memorizes the last reserved programmed recording mode, the timer reservation mode as memorized by the microprocessor being automatically adopted at the time of next reservation.

BACKGROUND OF THE INVENTION

Generally, users are familiar with the use of the most common and most convenient reservation mode among a plurality of reservation modes each for performing programmed recording in a VCR.

Therefore, assuming that a VCR plus reservation mode and the general reservation mode are contained in one unit of a VCR, the reservation is conventionally performed as follows. First a reservation is made in the form of the VCR plus mode, and then, when the user wants to make another reservation, again in the VCR plus mode, a general reservation key is pressed and a menu picture is displayed. Then the VCR plus mode is selected again from the menu, thereby selecting the reservation mode of a programmed recording.

Further, if the reservation key is input without setting the current time, the user has to set the current time after manually selecting the time adjusting mode. After the setting of the current time, the menu is displayed again, and the user has to select the VCR plus mode again thereupon, thereby causing much inconvenience.

SUMMARY OF THE INVENTION

It is an object of the present invention to overcome these problems and to provide an automatic setting method in a timer reservation mode for programmed recording in a VCR, in which, in the case where a VCR plus mode is used last, if the reservation key is pressed, the VCR plus mode is automatically reserved, thus causing the reservation procedure to be simplified. Further, if the reservation key is pressed without setting the current time, then a time adjusting mode is automatically carried out, and, after the user manually sets the current time, a memorized reservation mode is automatically reserved, thereby providing a convenience in reserving a programmed recording.

The automatic setting method in a timer reservation mode of the present invention, for carrying out a timer programmed recording in a VCR employing the features of multiple reservation modes, includes an automatic setting step for automatically setting the last reserved mode by memorizing the reserved mode in a microprocessor at the time of next reservation in the case where programmed recordings are carried out by a plurality of reservation modes. The invention further includes an automatic time adjustment mode implementing step for shifting the system to a time adjusting mode where the user adjusts the current time upon inputting a reservation key and upon selecting a reservation mode without setting the current time, and reserving the selected reservation mode after the user manually sets the current time.

BRIEF DESCRIPTION OF THE DRAWINGS

The above object and other advantages of the present invention will become more apparent by describing in detail the preferred embodiment of the present invention with reference to the attached drawings, in which:

FIGS. 2A and 2B are a flow chart showing the constitution of the automatic setting method in a timer reservation mode for a VCR according to the present invention.

DESCRIPTION OF THE PREFERRED EMBODIMENT

Figure 1:
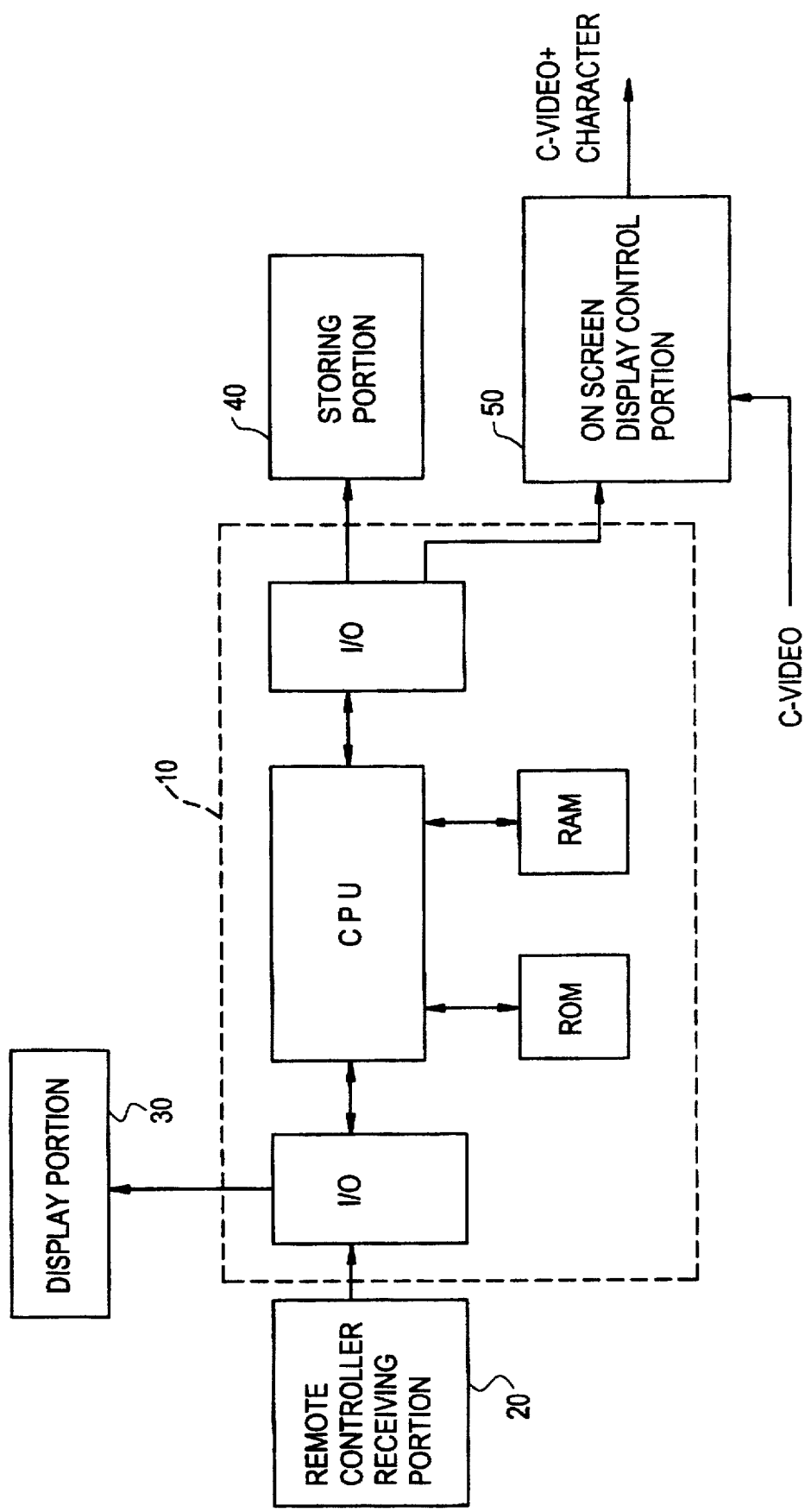
FIG. 1 is a block diagram of the hardware of the present invention.

The method of the present invention is applied to a VCR having the feature of being able to select amongst, for example, four reservation modes such as the VCR plus reservation mode, the video program text (termed VPT) reservation mode, the program delivery control (termed PDC) reservation mode and the on screen display (termed OSD) reservation mode in this embodiment.

FIG. 1 is a block diagram which consists of a remote controller receiving part (20) for receiving a key signal of a remote controller, a display part (30) for displaying the current time, a storing part (40) for storing data, an on-screen display controlling part (50) for displaying characters such as a menu, microprocessor (10) for controlling the above-mentioned blocks, the microprocessor being connected to the remote controller receiving part (20), displaying part (30), storing part (40) and on-screen display controlling part (50).

The storing part (40) stores data to be memorized for the long term and is composed of an EEPROM. For example, the channel number varies depending on the geographic area even though the broadcasting is made by the same broadcasting station. At this time, when the channel number of the same broadcasting station in accordance with the area is memorized by a user or a system manufacturer, it is stored in the storing part (40).

The on-screen display controlling part (50), as well as being connected to the microprocessor (10), is connected to a composite video signal (C-VIDEO) terminal, so that if character data is provided within the microprocessor (10), the character data is controlled to be displayed on a composite video screen.

The microprocessor (10) is composed of an input/output device, a CPU for performing a control function, a ROM having a program for performing the method of the present invention, and a RAM for temporarily storing data.

FIGS. 2A and 2B illustrate a flow chart showing the constitution of the automatic setting method in a timer reservation mode for a VCR according to the present invention, and, as shown in this drawing, the method of the present invention includes an automatic timer reservation setting step P1, and an automatic time adjustment mode implementing step P2.

The automatic reservation mode setting step P1 includes a memorized reservation mode fetching routine L1, a VCR plus reservation mode implementing routine L2, a VPT reservation mode implementing routine L3, and a PDC reservation mode implementing routine L4.

The automatic time adjustment mode implementing step P2 includes a reservation mode selecting routine L5, a time adjustment mode implementing routine L6 and a memorized reservation mode implementing routine L7.

The above routines will be described in detail.

The memorized reservation mode fetching routine L1 includes a discriminating sub-routine S1 for determining whether a reservation key has been input in order to perform a timer reservation, a discriminating sub-routine S2 for determining whether there is a pre-reserved program upon finding the inputting of a reservation key, and for returning to the automatic time adjustment mode implementing step P2 for displaying a menu upon not finding a reserved program and a fetching sub-routine S3 for fetching the last reserved reservation mode M1 upon finding a reserved program, the above sub-routines being carried out in the cited order.

The VCR plus reservation mode implementing routine L2 includes a discriminating sub-routine S4 for determining whether the fetched mode is the VCR plus mode, a sub-routine S5 for reserving the fetched VCR plus mode if the fetched mode is the VCR plus mode, and sub-routines S6 and S7 for storing the VCR plus mode as the last reservation mode M1 after the completion of the reservation, the above sub-routines being carried out in the cited order.

The VPT reservation mode implementing routine L3 includes a discriminating sub-routine S8 for determining whether the fetched reservation mode is a VPT reservation mode upon finding that the fetched reservation mode is not a VCR plus mode, a sub-routine S9 for reserving the fetched VPT reservation mode upon finding that the fetched mode is a VPT reservation mode, and sub-routines S10 and S11 for storing the VPT reservation mode as the last reservation mode M1 into the microprocessor after completion of the reservation, the above sub-routines being carried out in the cited order.

The PDC reservation mode implementing routine L4 includes a discriminating sub-routine S12 for determining whether the fetched mode is a PDC reservation mode, upon finding that the fetched reservation mode is not a VPT reservation mode, a sub-routine S13 for reserving the fetched PDC reservation mode upon finding that the fetched mode is a PDC reservation mode, and sub-routines S14 and S15 for storing the PDC reservation mode as the last reservation mode M1 into a microprocessor upon completion of the reservation, the above sub-routines being carried out in the cited order.

The reservation mode selecting routine L5 of the automatic time adjustment mode implementing step P2 includes a sub-routine S16 for displaying a menu picture when the fetched mode is an OSD reservation mode or when a reservation key is again pressed in order to reserve a mode other than ones memorized by the microprocessor, a discriminating sub-routine S17 for determining whether a reservation mode has been selected from the menu, a sub-routine S18 for carrying out a function of an input key upon finding that a reservation mode has not been selected and a sub-routine S19 for storing the selected reservation mode M2 into the microprocessor after the selection of a reservation mode, the above sub-routines being carried out in the cited order.

The time adjustment mode implementing routine L6 includes a discriminating sub-routine S20 for determining whether the current time has been manually set by the user, a sub-routine S21 for automatically advancing to a time adjusting mode in order to allow the user to manually set the current time upon finding that the current time has not been set, and a sub-routine S22 for allowing the user to manually set the current time, the above sub-routines being carried out in the cited order.

The step S20 determines whether the current time has been set, by assigning 1 bit of RAM of the microprocessor for this purpose and by using a software routine. That is, if the bit is 0, the software routine determines that the current time has not been set, whereas if the bit is set by 1, it determines that the current time has been set. At this time, the program is also accomplished if the main power is turned off and the 1 bit of RAM is cleared. Further, if the current time is set by using the current time setting key, the 1 bit of the RAM is to be set by 1.

The reservation mode implementing routine L7 includes a sub-routine S23 for fetching the stored reservation mode M2 of the sub-routine S19 after the completion of the setting of the current time, a sub-routine S24 for performing a reserving operation by the fetched reservation mode M2 of the sub-routine S23, and a sub-routine S25 for storing the reserved reservation mode as the last reservation mode M1 into the microprocessor, the above sub-routines being carried out in the cited order.

The method according to the present invention is operated as described below. If a user presses a discriminating sub-routine S1 is carried out to determine whether a reservation key is input. If a reservation key is input, the discriminating sub-routine S2 is carried out in order to determine whether there is a pre-input program. If there is a pre-input program, then the fetching sub-routine S3 is carried out in order to fetch the last reserved reservation mode from among the reserved programs. If it is determined that there is not a reserved reservation mode, then control shifts to step S16 to be described later. The last reserved reservation mode which is memorized by the microprocessor is represented by a parameter M1.

In FIGS. 2A and 2B, the encircled letters A, B and C relate to connectors for connecting the discontinuances in the flow chart. For example, an encircled letter A is shown in the N branch of step S2 and the N branch of step S12. Thus, if the N branch of step S2 is taken, the control flows to the N branch of step S12.

If the last reserved reservation mode M1 is fetched by carrying out the fetching sub-routine S3, then the discriminating sub-routine S4 is carried out in order to determine whether the fetched mode is a VCR plus mode. If it is found that the fetched mode is the VCR plus mode, the sub-routine S5 is carried out to complete the timer reservation in the form of the VCR plus reservation mode. Then the sub-routine S6 terminates the reservation of the timer, and the sub-routine S7 is carried out to store the VCR plus mode as the last reservation mode M1 into the microprocessor.

Meanwhile, if the last reservation mode M1, which is fetched at the sub-routine S3, is not a VCR plus mode at the discriminating sub-routine S4, the discriminating sub-routine S8 is carried out in order to determine whether the fetched last reservation mode M1 is a VPT reservation mode. If a VPT reservation mode is found, the sub-routine S9 is carried out to complete the timer reservation in the form of a VPT reservation mode. Then the sub-routine S10 is carried out to terminate the reservation, and the sub-routine S11 is carried out to store the VPT reservation mode as the last reservation mode M1 into the microprocessor.

Meanwhile, if the last fetched reservation mode M1 is not found to be a VPT reservation mode at the sub-routine S8, then the sub-routine S12 is carried out in order to determine whether the last reservation mode M1 is a PDC reservation mode. If it is found to be a PDC reservation mode, then the sub-routine S13 is carried out in order to complete the timer reservation in the form of a PDC reservation mode. Then the sub-routine S14 is carried out to terminate the reservation, and the sub-routine S15 is carried out to store the PDC reservation mode as the last reservation mode M1 into the microprocessor.

If the last fetched reservation mode M1 is not found to be a PDC reservation mode at the discriminating sub-routine S12, or if no program has been reserved at the discriminating sub-routine S2, the sub-routine S16 is carried out to display a menu picture. Here, if the reservation key is input twice in order to make a timer reservation by a reservation mode other than the last reservation mode stored in the microprocessor, the sub-routine S16 is carried out in the same manner in order to display the menu picture.

Then, the discriminating sub-routine S17 is carried out to determine whether a new reservation mode is selected. If a new reservation mode is not selected, the sub-routine S18 is carried out in order to perform a function of an input key, while if a new reservation mode is selected, then the newly selected reservation mode is stored into the microprocessor with a parameter M2.

After that, the discriminating sub-routine S20 is carried out to determine whether the current time has been set, and, if the current time has not been set, the sub-routine S21 is carried out to automatically advance to a time adjusting mode for allowing the user to manually adjust the current time. Thus, once the current time is set (S22), the sub-routine S23 is carried out in order to fetch the reservation mode M2 which has been selected and stored in the microprocessor.

Thus after the selected reservation mode is fetched by the sub-routine S23, the sub-routine S24 is carried out to complete the timer reservation in the form of the fetched reservation mode M2, and then, the sub-routine S25 is carried out to store the reservation mode of the sub-routine S24 as the last reservation mode M1 into the microprocessor. Meanwhile, if it is determined that the current time had been set at the discriminating sub-routine 20, the sub-routines S24 and S25 are carried out to reserve by the selected reservation mode and to store the reserved mode as the last reservation mode M1 into the microprocessor.

According to the present invention as described above, if programmed recordings are performed by multiple reservation modes, the last reserved mode is memorized by the microprocessor. If a reservation key is pressed at the next reservation, the timer reservation is carried out automatically by the memorized reservation mode. Furthermore, if the current time has not been set upon reservation, the time adjusting mode is automatically carried out in order to set the current time, thereafter automatically performing the reservation mode memorized, thereby providing a convenience to users.

What is claimed is:

1. An automatic setting method for setting a timer reservation mode in a VCR employing an electronic memory to a specific mode from a plurality of possible modes, including steps of:
   (a) storing the mode of a currently performed timer operation in the electronic memory;
   (b) reading said mode out of said electronic memory when a next timer operation is performed; and
   (c) using the read-out mode as the mode for said next timer operation.

2. A method as claimed in claim 1 wherein said step (c) involves checking to determine which of said plurality of modes is equal to said read-out mode.

3. A method as claimed in claim 1 wherein said electronic memory is a memory in a microprocessor.

4. An automatic setting method for setting a timer reservation mode in a VCR to a specific mode from a plurality of possible modes, including steps of:
   (a) storing the mode of a currently performed timer operation in a memory;
   (b) reading said mode out of said memory when a next timer operation is performed; and
   (c) using the read-out mode as the mode for said next timer operation, wherein said step (c) involves checking to determine which of said plurality of modes is equal to said read-out mode.

5. A method of operating a programmable video recorder, comprising the steps of:
   (a) storing in an electronic memory mode data indicative of which of a plurality of programming modes was last used; and
   (b) detecting an input programming command and operating the video recorder according to the programming mode indicated by the mode data stored in the electronic memory.

6. A method according to claim 5, including the steps of:
   (c) detecting whether a clock means associated with a video recorder is set with the current time; and
   (d) if the clock means is not set with the current time, operating the video recorder according to a timer setting routine to set the clock means to the current time.

7. A method according to claim 6, including the step of:
   (e) detecting whether data indicating a programming mode has been stored in the electronic memory and, if not, selecting a programming mode in response to a user input command and storing in the electronic memory mode data indicating the selected programming mode, wherein if it is detected that no programming mode data is stored in the electronic memory, step (a) is skipped and steps (c) and (d) are performed before step (b).

8. A method as claimed in claim 5 wherein said electronic memory is a memory in a microprocessor.

9. A method as claimed in claim 6 wherein said electronic memory is a memory in a microprocessor.

10. A method as claimed in claim 7 wherein said electronic memory is a memory in a microprocessor.

* * * * *